United States Patent
Gunugunuri et al.

(10) Patent No.: US 10,071,367 B1
(45) Date of Patent: Sep. 11, 2018

(54) CEO$_2$-NIO MIXED OXIDE CATALYSTS FOR DIRECT NOX DECOMPOSITION

(71) Applicant: Toyota Motor Engineering & Manufacturing North America, Inc., Erlanger, KY (US)

(72) Inventors: Krishna Gunugunuri, Canton, MI (US); Charles Alexander Roberts, Farmington Hills, MI (US); Torin C. Peck, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/605,178

(22) Filed: May 25, 2017

(51) Int. Cl.
*B01J 23/10* (2006.01)
*B01J 23/755* (2006.01)
(Continued)

(52) U.S. Cl.
CPC .......... *B01J 23/83* (2013.01); *B01D 53/9413* (2013.01); *B01J 37/009* (2013.01); *B01J 37/0236* (2013.01); *B01J 37/031* (2013.01); *B01J 37/04* (2013.01); *B01J 37/06* (2013.01); *B01J 37/088* (2013.01); *F01N 3/2066* (2013.01); *F01N 3/2839* (2013.01); *B01D 2255/2065* (2013.01);
(Continued)

(58) Field of Classification Search
CPC .......... B01J 23/10; B01J 23/755; B01J 23/83; B01D 53/9415
See application file for complete search history.

(56) References Cited

U.S. PATENT DOCUMENTS 4,018,710 A * 4/1977 Oshimura .......... B01D 53/9418
423/213.5
4,504,598 A * 3/1985 Ono .................. B01D 53/945
423/213.5
(Continued)

OTHER PUBLICATIONS

Masui, T. et al., "Effect of the introduction of oxide ion vacancies into cubic fluorite-type rare earth oxides on the NO decomposition catalysis," Journal of Solid State Chemistry, 220, pp. 181-184 (2014).
(Continued)

*Primary Examiner* — Cam N Nguyen
(74) *Attorney, Agent, or Firm* — Christopher G. Darrow; Darrow Mustafa PC (57) ABSTRACT

Active catalysts for the treatment of a low temperature exhaust gas stream are provided for the direct decomposition removal of $NO_x$ from an exhaust gas stream. The catalyst system may include a mixed oxide composition including cerium oxide and nickel oxide $CeO_2$—NiO. The exhaust gas stream may be provided at a temperature of from about 400° C. to about 650° C. Methods for making the catalyst include co-precipitation techniques, using KOH as a precipitating agent. The catalyst system is configured to catalyze a decomposition of the NOx to generate $N_2$ without the presence of a reductant. The catalyst may be a cubic structure, with nickel incorporated in a cubic lattice of cerium. The catalyst composition may be represented as $Ce_{0.5}Ni_{0.5}O_2$.

11 Claims, 8 Drawing Sheets

(51) Int. Cl.
  *B01J 23/83*    (2006.01)
  *B01D 53/94*    (2006.01)
  *B01J 37/03*    (2006.01)
  *B01J 37/04*    (2006.01)
  *B01J 37/00*    (2006.01)
  *B01J 37/02*    (2006.01)
  *B01J 37/08*    (2006.01)
  *B01J 37/06*    (2006.01)
  *F01N 3/20*     (2006.01)
  *F01N 3/28*     (2006.01)

(52) U.S. Cl.
  CPC .............. *B01D 2255/20753* (2013.01); *B01D 2255/40* (2013.01); *F01N 2370/02* (2013.01)

(56) References Cited

U.S. PATENT DOCUMENTS

| | | | | |
|---|---|---|---|---|
| 5,073,532 A * | 12/1991 | Domesle | .............. | B01D 53/945 423/213.5 |
| 5,179,059 A * | 1/1993 | Domesle | .............. | B01D 53/945 423/213.5 |
| 5,286,699 A * | 2/1994 | Ohata | .................. | B01D 53/945 502/304 |
| 5,492,878 A * | 2/1996 | Fujii | .................... | B01D 53/945 423/213.5 |
| 6,180,075 B1 * | 1/2001 | Lindner | ............... | B01D 53/945 423/213.2 |
| 7,175,822 B2 | 2/2007 | Nakatsuji | | |
| 2016/0296915 A1 * | 10/2016 | Nagata | ..................... | B01J 37/10 |

OTHER PUBLICATIONS

Hong, W.J., et al., Effect of Mn content on physical properties of CeOx-MnOy support and BaO-CeOx-MnOy catalysts for direct NO decomposition, 277, pp. 208-216 (2011).

Hong, W.J. et al., "Effect of Fe content on physical properties of BaO-CeOx-FeOy catalysts for direct NO decomposition," Applied Catalysis B: Environmental, 106, pp. 142-148 (2011).

Hong, W.J. et al., "Direct NO decomposition over a Ce—Mn mixed oxide modified with alkali and alkaline earth species and CO2-TPD behavior of the catalysts," Catalysis Today, 164, pp. 489-494 (2011).

Hong, W.J. et al., Synthesis of Highly Effective CeOx-MnOy-BaO Catalysts, Catal Lett, 142, pp. 32-41 (2012).

Zhang, J. et al., A DFT + U study of NO evolution at reduced CeO2(110), Phys. Chem. Chem. Phys., 16, pp. 16904-16908 (2014).

Serga, V. et al., "Production of CeO2/NiO and CeO2/NiO-Pt Nanocomposites by EPM," International Journal of New Technology and Research (IJNTR), vol. 2, Iss. 3, pp. 123-127 (Mar. 2016).

Mahofa, E. et al., "Catalytic Activity of Ce(2-NiO for Low Temperature Soot Combustion," International Journal of Engineering Research & Technology (IJERT), vol. 3, Iss. 9, pp. 48-51 (Sep. 2014).

Wang, Y. et al., "Catalytic reduction of NO by CO over NiO/CeO2 catalyst in stoichiometric NO/CO and NO/CO/O2 reaction," Applied Catalysts B: Environmental, 81, pp. 141-149 (2008).

* cited by examiner

CEO₂-NIO MIXED OXIDE CATALYSTS FOR DIRECT NOX DECOMPOSITION

TECHNICAL FIELD

The present disclosure generally relates to catalysts for treatment of an exhaust gas stream and, more particularly, to mixed oxide catalysts containing cerium oxide and nickel oxide for the removal of nitrogen oxides from an exhaust gas stream as generated by an internal combustion engine, or the like.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NOx from exhaust emissions are desirable in order to protect the environment and to comport with regulations directed to that purpose. It is preferable that such catalysts convert NOx to inert nitrogen gas, instead of converting NOx to other nitrogen-containing compounds. Catalysts that are effective at low temperature may have additional utility for vehicles.

Increasingly stringent NOx emission and fuel economy requirements for vehicles and automobile engines will require catalytic NOx abatement technologies that are effective under lean-burn conditions. Direct NOx decomposition to $N_2$ and $O_2$ is an attractive alternative to NOx traps and selective catalytic reduction (SCR) for this application, as NOx traps and SCR processes are highly dependent on reductants (such as unburned hydrocarbons or CO) to mitigate NOx. The development of an effective catalyst for direct NOx decomposition would eliminate the use of reducing agents, simplifying the NOx removal process, and therefore decreasing the fuel efficiency cost of NOx abatement.

However, most catalysts active for direct NOx decomposition are only efficient at high temperatures (i.e., greater than about 600° C.), which severely limits a practical application for a vehicle exhaust gas stream. The most well-known low temperature (i.e., less than about 500° C.) direct NOx decomposition catalysts include Cu-ZSM5, $K/Co_3O_4$, $Na/Co_3O_4$, CuO, and $Ag/Co_3O_4$. However, low temperature activity and selectivity to $N_2$ for all of these catalysts is not sufficient for practical application, and more advancements are needed. Advancements in direct NOx decomposition catalysis based on structure activity relationships are lacking, and methodology to improve the performance of specific catalyst systems is needed.

Accordingly, it would be desirable to provide a catalyst for the removal of NOx from exhaust gas, that is effective at low temperature and that has high $N_2$ product specificity.

SUMMARY

This section provides a general summary of the disclosure, and is not a comprehensive disclosure of its full scope or all of its features.

In various aspects, the present teachings provide a catalyst system for the direct decomposition removal of $NO_x$ from an exhaust gas stream. The exhaust gas stream may be provided at a temperature of from about 400° C. to about 650° C. The catalyst system may include a mixed oxide composition including cerium oxide and nickel oxide ($CeO_2$—NiO). Methods for making the catalyst include co-precipitation techniques, using KOH as a precipitating agent. The catalyst system is configured to catalyze a decomposition of the NOx to generate $N_2$ without the presence of a reductant. The catalyst may be a cubic structure, with nickel incorporated in a cubic lattice of cerium. The catalyst composition may be represented as $Ce_{0.5}Ni_{0.5}O_2$.

In other aspects, the present teachings provide a catalytic converter for the direct decomposition removal of $NO_x$ from an exhaust gas stream. The exhaust gas stream may be flowing through the catalytic converter at a temperature of from about 400° C. to about 650° C. The catalytic converter may include an inlet configured to receive the exhaust gas stream into an enclosure, and an outlet configured to allow the exhaust gas stream to exit the enclosure. A catalyst system may be contained inside the enclosure, the catalyst system including a mixed oxide composition including cerium oxide and nickel oxide ($CeO_2$—NiO), configured to catalyze a decomposition of the NOx to generate $N_2$ without the presence of a reductant. The catalyst may be a cubic structure, with the composition $Ce_{0.5}Ni_{0.5}O_2$.

In still further aspects, the present teachings provide methods for the direct decomposition removal of $NO_x$ from a low temperature exhaust gas stream. The methods may include flowing the exhaust gas stream through a catalyst system. This includes exposing the exhaust gas stream to a catalyst system including a mixed oxide composition including cerium oxide and nickel oxide ($CeO_2$—NiO). The exposure results in catalyzing a decomposition of the NOx to generate $N_2$ without the presence of a reductant. In various aspects, the catalyst may be a cubic structure, with the composition $Ce_{0.5}Ni_{0.5}O_2$. Flowing the exhaust gas stream through the catalyst system at a temperature at or greater than about 400° C. may result in obtaining an NOx selectivity to $N_2$ greater than about 95%.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide an active catalyst for the treatment of a low temperature exhaust gas stream. This technology is specifically related to the development of new catalysts for direct NOx decomposition to nitrogen ($N_2$) and oxygen ($O_2$). More specifically, the present teachings disclose a mixed oxide catalyst, co-precipitated having cerium oxide and nickel oxide ($CeO_2$—NiO). This mixed oxide catalyst, with the composition $Ce_{0.5}Ni_{0.5}O_2$, exhibits nearly 100% selectivity to $N_2$ product formation from 400° C. to 650° C. As detailed herein, the addition of NiO mixed with a $CeO_2$ catalyst increases the activity (i.e., rate of $N_2$ production per mass of catalyst) by a multiple of about twenty (20) times at a temperature of about 400° C., and increases the activity by a multiple of about 10,000 times at a temperature of about 650° C., as compared to a $CeO_2$ catalyst without.

Direct decomposition, as discussed herein, refers to catalytic transformation of nitrogen oxides to elemental nitrogen and oxygen. This differs, for example, from catalytic reduction of nitrogen oxides to ammonia and water. The low temperature (i.e., from about 400° C. to about 650° C.), direct decomposition is accomplished without the need of a reductant or secondary reducing reagents (i.e., $H_2$, CO, $C_3H_6$ or other hydrocarbons, and/or soot), thereby improving fuel efficiency. This is greatly beneficial to improve the energy utilization of a vehicle engine because the reducing agents of carbon monoxide and unburnt hydrocarbons are produced as a result of inefficient combustion.

The composition of the present teachings, $Ce_{0.5}Ni_{0.5}O_2$, otherwise referred to herein as a mixed oxide catalyst, co-precipitated having cerium oxide and nickel oxide ($CeO_2$—NiO), is a cubic structure that exhibits stable direct NOx decomposition activity beginning at about 400° C. The $CeO_2$—NiO catalyst system exhibits better direct NOx decomposition activity as compared to the component oxide $CeO_2$ alone, in the relevant temperature range of from about 400° C. to about 650° C. Additionally, the $CeO_2$—NiO catalyst system exhibits almost 100% selectivity to $N_2$ at temperatures in the range of from about 400° C. to about 650° C. Previously, no ceria-based mixed oxide has been known for direct NOx decomposition at temperatures lower than about 600° C.

The presently disclosed catalyst system includes methods for dispersing nickel oxide within a metal oxide support, specifically an oxide support with known $N_2O$ decomposition activity (i.e., $CeO_2$), via co-precipitation techniques. This method particularly provides for improved total yield of product $N_2$ and product selectivity to $N_2$ (versus undesired $N_2O$ and/or $NO_2$ products) during low temperature direct NOx decomposition as compared to either the bare $CeO_2$ support only or NiO. Because of the high selectivity to $N_2$ for the present teachings, the undesirable $N_2O$ product is not produced in a significant quantity during the direct NO decomposition over $Ce_{0.5}Ni_{0.5}O_2$.

As detailed herein, the present teachings not only include the development of the catalyst system, but also the utilization of the catalyst system with exhaust gas streams, particularly with catalytic converters for vehicles, automobiles, and the like, as well as including methods of synthesizing the $CeO_2$—NiO catalyst system.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Synthesis and Material Characterization

The $CeO_2$—NiO can be synthesized using a co-precipitation method with KOH as a precipitating agent. For example, $CeO_2$ and NiO can be synthesized for reference and comparison using a precipitation method.

$CeO_2$—NiO synthesis (1:1 Ni:Ce molar ratio): The precursors used are ammonium cerium nitrate and nickel nitrate. In a typical synthesis, the required quantities of ammonium cerium nitrate and nickel nitrate are dissolved separately in deionized water and then mixed together. Next, a 1M KOH solution can be added, dropwise, to the mixed solution until precipitation completes (pH~9). Then the resulting slurry can be filtered off and thoroughly washed with distilled water until free from K impurities. The hydroxide thus obtained can be dried at about 120° C. for about 12 hours. The final product is obtained after calcination at a temperature of about 500° C. for 5 hours, in atmospheric air.

$CeO_2$ synthesis: The precursor used in accordance with the present teachings can be ammonium cerium nitrate. In one exemplary synthesis, the required quantity of ammonium cerium nitrate can be dissolved in deionized water. Next, a 1M KOH solution can be added, dropwise, to the ammonium cerium nitrate solution until precipitation completes (pH~9). Then the resulting slurry can be filtered off and thoroughly washed with distilled water until free from K impurities. The hydroxide thus obtained were dried at 120° C. for 12 hours. The final product was obtained after calcination at 500° C. for 5 hours in atmosphere air.

NiO synthesis: NiO can be synthesized by the same precipitation method described above for $CeO_2$, but instead substituting a nickel nitrate for the precursor.

Performance Evaluation and Catalyst Characterization

The phase composition of catalysts can be measured using X-ray diffraction measurements. As an example, X-ray powder diffraction (XRD) measurements can be performed using a Rigaku SmartLab X-Ray Diffractometer. Spectra can be collected over a 2θ range of from 20-80 degrees at a rate of 0.5 deg./min, with a step size of 0.02 deg./step. Structural assignments can be made using PDXL software. The phase composition of the materials can be determined using the ICDD-PDF database.

NO adsorption capacities of the $CeO_2$, NiO, $CeO_2$—NiO catalysts can be measured using a NETZSCH STA-449 thermogravimetric analyzer equipped with mass spectrometer. Before the experiment, the catalysts can be preheated to about 600° C. in the presence of 20% $O_2$/He. After the pretreatment, the temperature can be decreased to about 100° C. Next, NO can be adsorbed by passing 2% NO/He over the catalyst for about 4 hours. The NO adsorption capacity can be calculated by measuring the weight before and after NO adsorption.

The NO adsorption properties can be measured using in situ Fourier transform infrared (FT-IR) spectroscopic measurements. The Harrick High Temperature Cell with environmental (gas flow) and temperature control can be used for in situ diffuse-reflectance FT-IR spectroscopy. Spectra can be recorded using a Thermo Scientific Nicolet 8700 Research FT-IR Spectrometer equipped with a liquid $N_2$ cooled MCT detector. For example, Spectra can be obtained with a resolution of 2/cm and by averaging 64 scans. In situ diffuse-reflectance FT-IR spectra can be collected during NO adsorption at a temperature of about 300° C. Prior to NO adsorption, the sample can first be pretreated at a temperature of about 350° C. in 30 ml/min of 10% $O_2$/He. The background spectrum (64 scans) can be of the catalyst after cooling to a temperature of about 300° C. in 30 ml/min of UHP He. Adsorption of NO was achieved by flowing 30 ml/min of 1% NO over the catalyst for 25 min. Adsorption of NO can be allowed to proceed for 25 min while spectra were obtained every minute using a series collection. To compare peak intensities among different catalyst samples, the adsorption spectra can be normalized to the NO gas phase peak at about 1876/cm.

The NO desorption properties can be measured using temperature programmed desorption of NO (NO-TPD) experiments. The NO-TPD experiments can be performed using a 3flex Surface Characterization Analyzer, from Micromeritics, equipped with mass spectrometer for gas phase analysis. Before the experiment, the catalysts can be preheated to a temperature of about 300° C. in the presence of 20% $O_2$/He. After pretreatment, the temperature can be decreased to about 100° C., and NO can be adsorbed by passing 2% NO/He over the sample for about 1 hour. Following NO adsorption, physisorbed gases can be removed by passing helium for 1 hour. NO desorption properties can be measured by ramping the temperature from 100° C. to 700° C. in the presence of helium. The desorbed gases (NO, $N_2$, $O_2$, $N_2O$ and $NO_2$) can be monitored by using an MKS Cirrus-2 mass spectrometer.

For direct NOx decomposition to occur, NO must directly decomposes to $N_2$ and $O_2$ over the catalyst surface. However, there is a possibility for unwanted $N_2O$ and $NO_2$ formation as side products, especially in the case of $NO_2$, where formation is thermodynamically favorable at lower reaction temperatures. The unwanted formation of $N_2O$ usually occurs if NO is only partially reduces. Therefore, in addition to high NO conversion, it is also very important to have higher selectivity towards $N_2+O_2$ formation rather than $N_2O$ or $NO_2$. The reaction can be represented as:

$$(4a+4c-2b)NO \rightarrow aN_2+bO_2+cN_2O+(2a-2b+c)NO_2$$

In this regard, the selectivity towards $N_2$ can be defined as:

$N_2$ selectivity (%)=2*[$N_2$]/(2*[$N_2$]+0.5[$N_2O$]+[$NO_2$])

Figure 1:
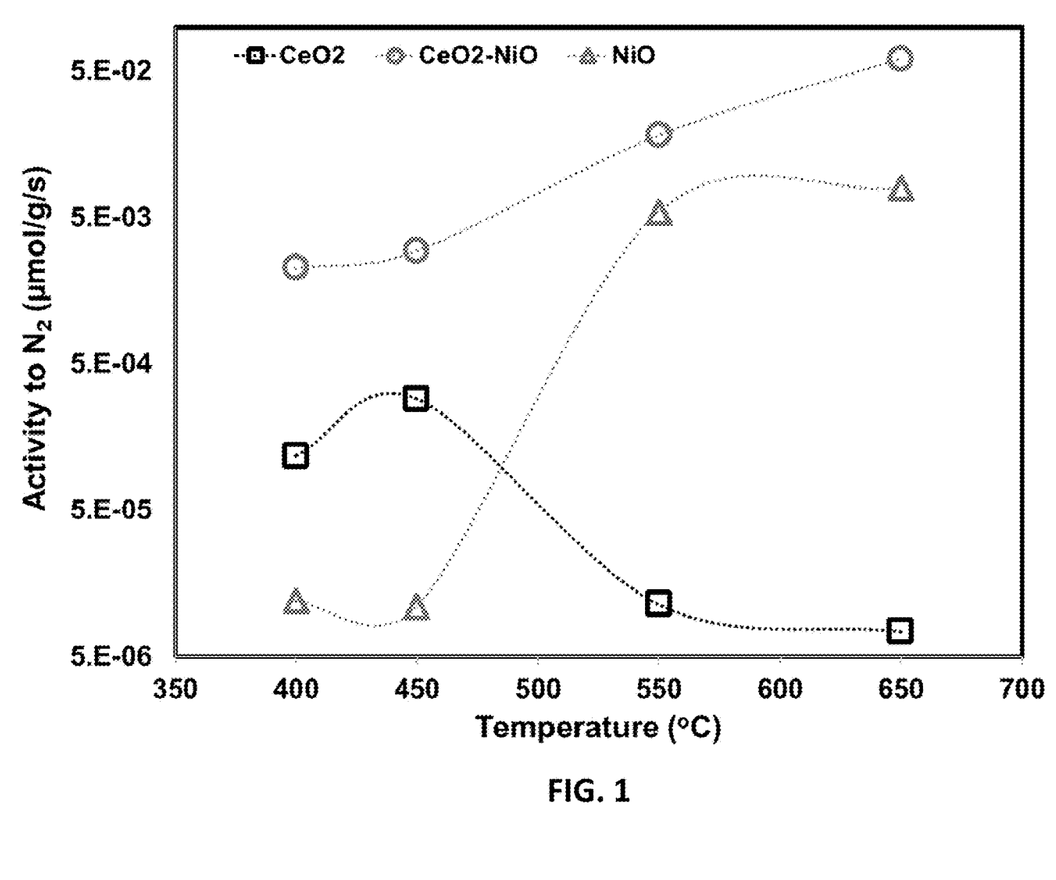
FIG. 1 illustrates NO conversion profiles (activity) over $CeO_2$, NiO, and $CeO_2$—NiO catalysts with respect to the reaction temperature.

FIG. 1 illustrates the direct NOx activity over the $CeO_2$, NiO, and $CeO_2$—NiO catalysts as a function of reaction temperature. As shown in FIG. 1, the NOx decomposition activity over the $CeO_2$ alone increases slightly with increasing temperature from about 400° C. to about 450° C.; however, a further increase in the reaction temperature to about 550° C. and about 650° C. results in a decrease in the direct NOx decomposition activity. The decrease in the activity is due to the deactivation of the catalyst. On the other hand, pure NiO is almost inactive at lower reaction temperatures. However, the activity increases about 100 times with an increase in temperature of from about 450° C. to 550° C. These measurements show that $CeO_2$ is only slightly active for direct NOx decomposition at a low temperature before deactivating, and NiO is only active at higher reaction temperatures. Remarkably, the $CeO_2$—NiO mixed oxide catalyst system according to the present technology exhibits much better activity as compared to $CeO_2$ or NiO alone. For example, the $CeO_2$—NiO catalyst system exhibits about twenty (20) times higher activity than $CeO_2$, and 100 times better activity than NiO at temperatures of about 400° C. and about 450° C. The direct NOx activity increases with increasing reaction temperature from about 400 C to about 650° C. At about 650° C., the $CeO_2$—NiO catalyst system exhibits more than about 1,000 times increased activity than $CeO_2$ alone.

Figure 2:
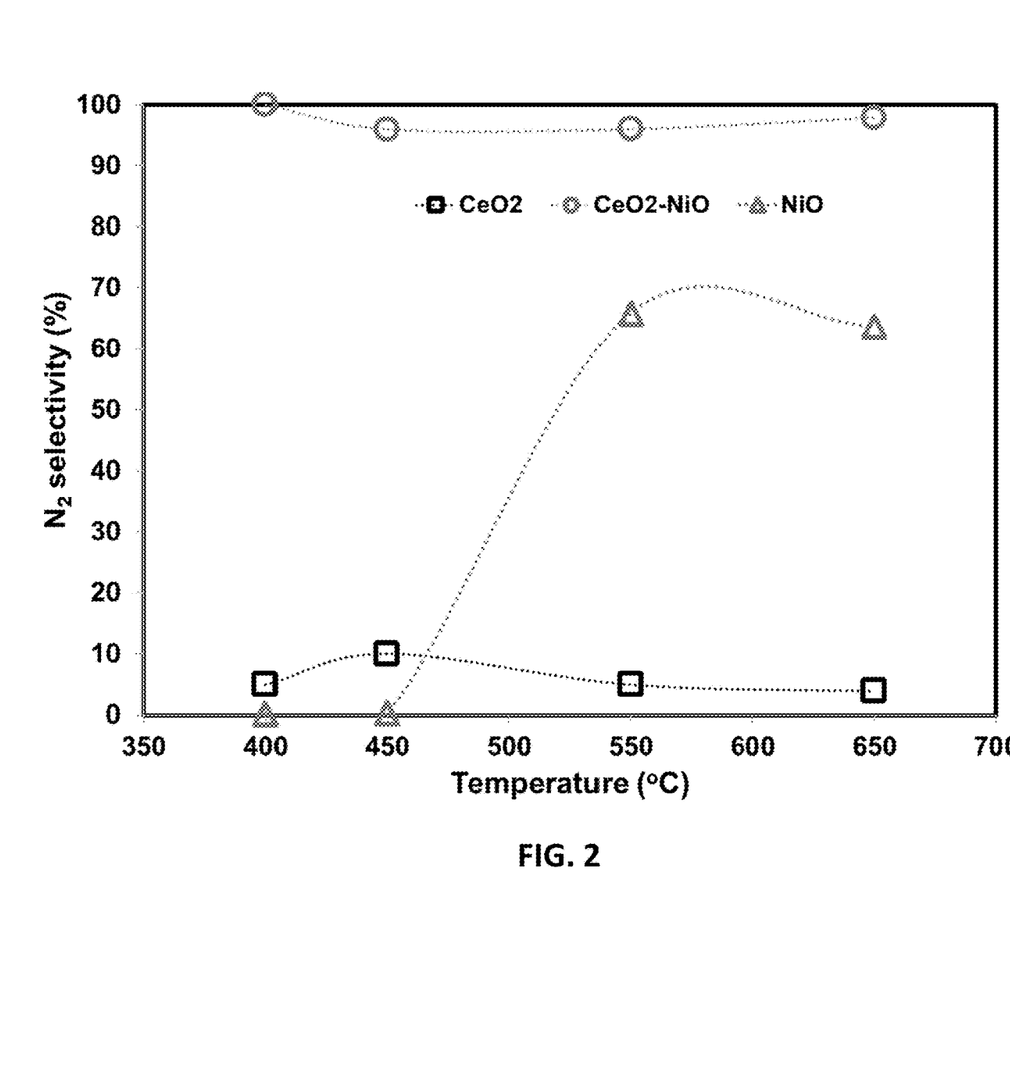
FIG. 2 illustrates $N_2$ selectivity profiles over $CeO_2$, NiO, and $CeO_2$—NiO catalysts with respect to a reaction temperature range from 400° C. to 650° C.

To confirm direct NOx decomposition to $N_2$ is taking place, rather than the unwanted side products of $N_2O$ or $NO_2$, the $N_2$ selectivity can be calculated as defined above. Using an FTIR detector for product analysis, it is possible to detect and quantify the concentration of NO, $N_2O$, and $NO_2$ species from the outlet of the reactor during direct NOx decomposition evaluation. FIG. 2 illustrates the $N_2$ selectivity profiles calculated for the $CeO_2$, NiO and $CeO_2$—NiO at temperatures of from 400° C. to 650° C. As mentioned above, the NO decomposition to $N_2$ is an important consideration for exhaust automotive emissions. The formation of the side products of $N_2O$ and $NO_2$ are also harmful to the environment, and are not a safe alternative to exhaust containing NO alone. The $CeO_2$ catalyst exhibits less than 10% $N_2$ selectivity at all the reaction temperatures, meaning the majority of the NO is converting to $NO_2$ or $N_2O$, rather than $N_2$. NiO also exhibits less than 1% selectivity to $N_2$ at temperatures of about 400° C. and 450° C. The low $N_2$ selectivity of these materials once again confirms that neither $CeO_2$ nor NiO, by themselves, are good candidates as catalysts for direct NOx decomposition. Remarkably, $CeO_2$—NiO catalyst systems exhibit near 100% selectivity towards $N_2$, even at a temperature of about 400° C. The $CeO_2$—NiO catalyst systems also exhibit near 100% $N_2$ selectivity at temperatures of from about 450° C. to about 650° C. These results suggest that a $CeO_2$—NiO catalyst system is a very good candidate for direct NOx decomposition since it exhibits both high overall reaction activity, and high selectivity to $N_2$ at temperatures as low as about 400° C.

Figure 3:
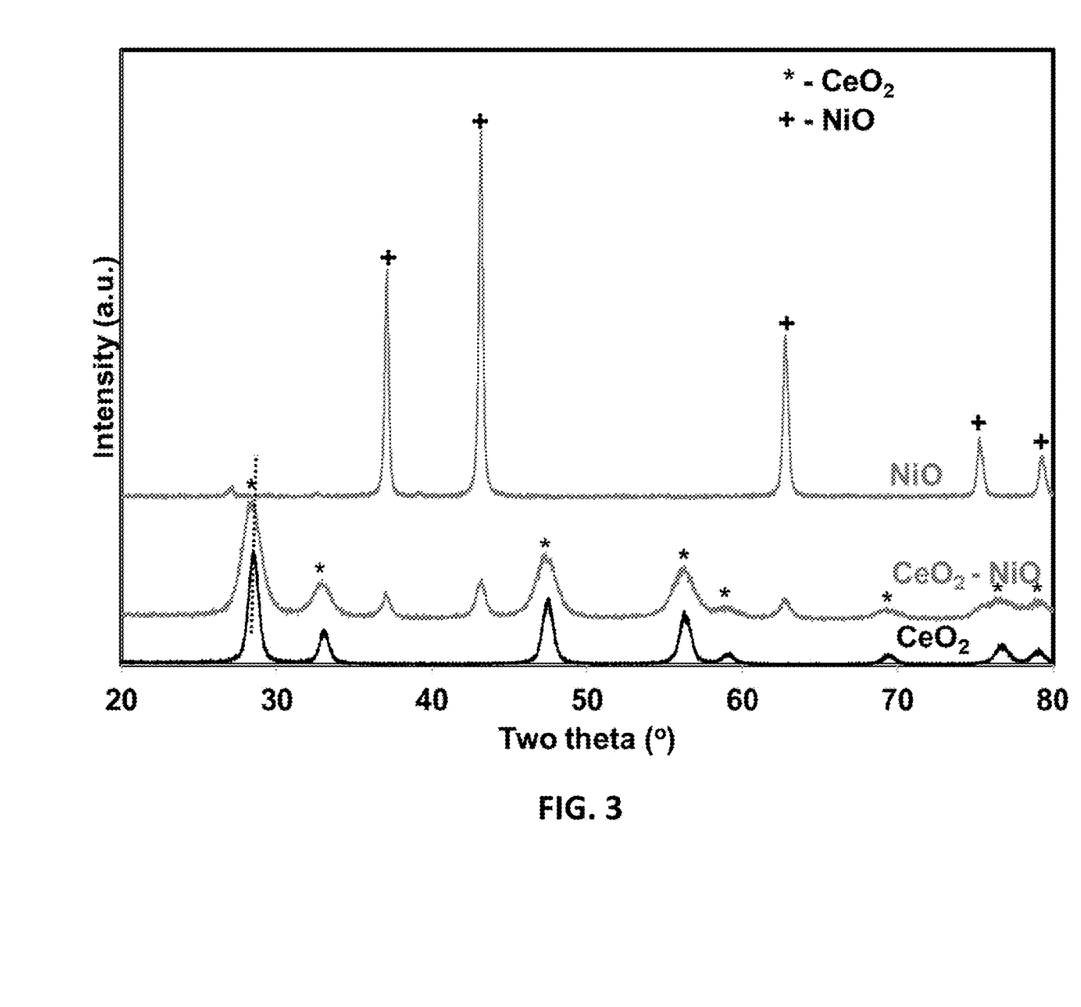
FIG. 3 illustrates x-ray diffraction profiles of the $CeO_2$, NiO, and $CeO_2$—NiO catalysts after calcination.

Structural and surface characterization measurements can also be performed over the $CeO_2$, NiO, and $CeO_2$—NiO catalysts in order to understand the influence of nickel incorporation in the cubic lattice of ceria. FIG. 3 illustrates the XRD measurements of $CeO_2$, NiO, and $CeO_2$—NiO catalysts after calcination. For example, after calcination, NiO exhibits peaks at 37.07, 43.13, 62.77, 75.33, and 79.29 degrees. These 20 values correspond to reflections of (111), (200), (220), (311), and (222) planes that are indications of the presence of the rock salt structure with octahedral Ni(II) and $O^{2-}$ sites. No other peaks are observed in FIG. 3 that suggest the purity of the sample. $CeO_2$ exhibits peaks at 28.5, 33.02, 47.3, 56.22, 59.1, 69.26, 77.5, and 79.04 degrees. These 2θ values correspond to reflections of (111), (200), (220), (311), (222), (400), (331), and (420) planes of the cubic fluorite structure of ceria. $CeO_2$—NiO exhibits peaks due to both $CeO_2$ and NiO phases. Compared to $CeO_2$ alone, the $CeO_2$—NiO exhibits a slight shift to lower 2θ and a broadening of the peaks. These differences in the measurements indicate that Ni enters into the cubic fluorite structure of the ceria, and forms Ce—Ni solid solution. The crystallite sizes of $CeO_2$, NiO, and $CeO_2$—NiO are calculated from the (111) plane using the Scherrer equation and are presented in Table 1. $CeO_2$ and NiO exhibit crystallite sizes of 10.2 nm and 26.7 nm, respectively. Interestingly, $CeO_2$—NiO exhibits smaller crystallite sizes for $CeO_2$ (4.7 nm) and NiO (7.02 nm) compared to the pure oxides. The decrease in the crystallite size also confirms the formation of Ce—Ni solid solution.

TABLE 1 crystallite size and NOx adsorption capacities of $CeO_2$, NiO and $CeO_2$—NiO catalysts

| Sample | Crystallite size (nm) | | NO adsorption capacity (μmol/g) |
| --- | --- | --- | --- |
| | $CeO_2$ | NiO | |
| $CeO_2$ | 10.2 | — | 439 |
| NiO | — | 26.7 | 239 |
| $CeO_2$—NiO | 4.7 | 7.0 | 219 |

Figure 4:
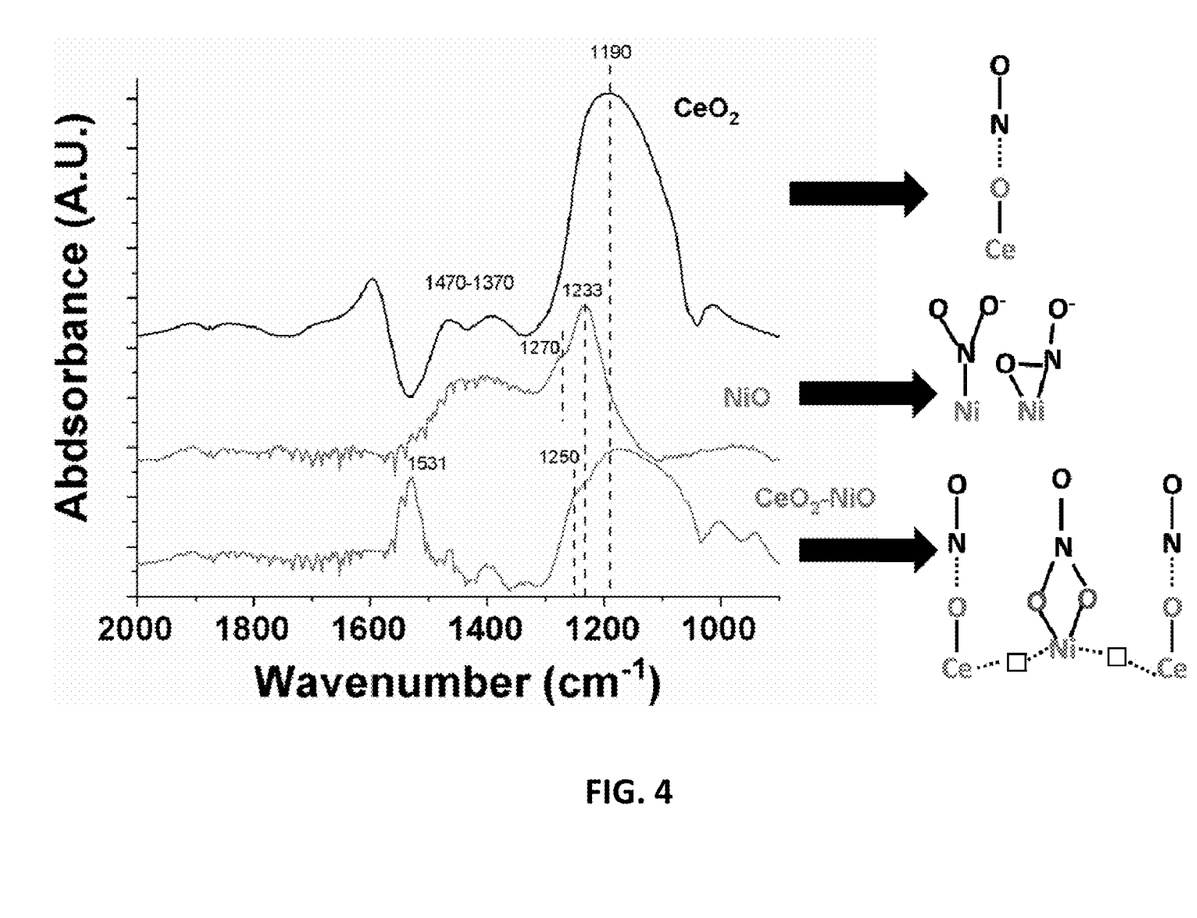
FIG. 4 illustrates in situ FT-IR spectra of the $CeO_2$, NiO, and $CeO_2$—NiO catalysts during NOx adsorption at a temperature of about 300° C.

The NOx adsorption capacities of $CeO_2$, NiO, and $CeO_2$—NiO catalysts can be measured using TGA, and are presented in Table 1. The $CeO_2$—NiO mixed oxide exhibits much higher NO adsorption capacity (439 μmol/g), as compared to the $CeO_2$ (249 μmol/g) and NiO (219 μmol/g) alone. The NOx adsorption properties of $CeO_2$, NiO, and $CeO_2$—NiO catalysts can be studied using in situ FT-IR spectroscopy. FIG. 4 illustrates the in situ FT-IR spectra of $CeO_2$, NiO, and $CeO_2$—NiO during NOx adsorption at a temperature of about 300° C. FIG. 4 also includes a schematic representation of the intermediates formed on $CeO_2$, NiO, $CeO_2$—NiO during NOx adsorption. $CeO_2$ exhibits a peak at 1190 $cm^{-1}$ wavenumbers and a broad peak spanning 1470-1370 $cm^{-1}$. These peaks correspond to v(N—O) and v(N=O) stretching vibrations of the monodentate nitrito species. Along with monodentate nitrito peaks, ceria also exhibits a negative peak at 1570 $cm^{-1}$. The negative peaks in the in situ FT-IR spectra occur as NOx is consumed during the adsorption. As gas phase NOx is consumed during adsorption, it interacts with the $CeO_2$ surface and makes structural changes to the surface resulting in the negative FTIR peak. Because of the structural changes during NOx adsorption, $CeO_2$ deactivates during the direct NOx decomposition reaction. On the other hand, NiO exhibits peaks at 1234 and 1265 $cm^{-1}$ and a broad peak between 1400 to 1500 $cm^{-1}$ in the in situ FT-IR spectra during NOx adsorption. The peaks at 1234 and 1400-1500 $cm^{-1}$ are due to the symmetric and anti-symmetric vibrations of the free nitrites, respectively. The peaks at 1265 and 1400-1500 $cm^{-1}$ are due to the v(N—O) and v(N=O) stretching vibrations of the nitro-nitrato intermediates, respectively. No negative peaks are observed for NiO, which suggests that NOx is not making any structural changes to the surface, and only forms nitrite intermediates. Interestingly, the adsorption FTIR spectra for $CeO_2$—NiO also contains no negative peaks. It exhibits additional peaks at 1250 and 1531 $cm^{-1}$, along with the peaks due to the monodentate nitrate intermediates. The additional peaks are corresponding to the split mode of the chelating nitrato intermediates. These results suggest that precipitating $CeO_2$ and NiO together to form the $CeO_2$—NiO mixed oxide creates additional NOx adsorption sites that participate in the direct NOx decomposition mechanism as compared to either the $CeO_2$ or NiO alone.

Figure 5:
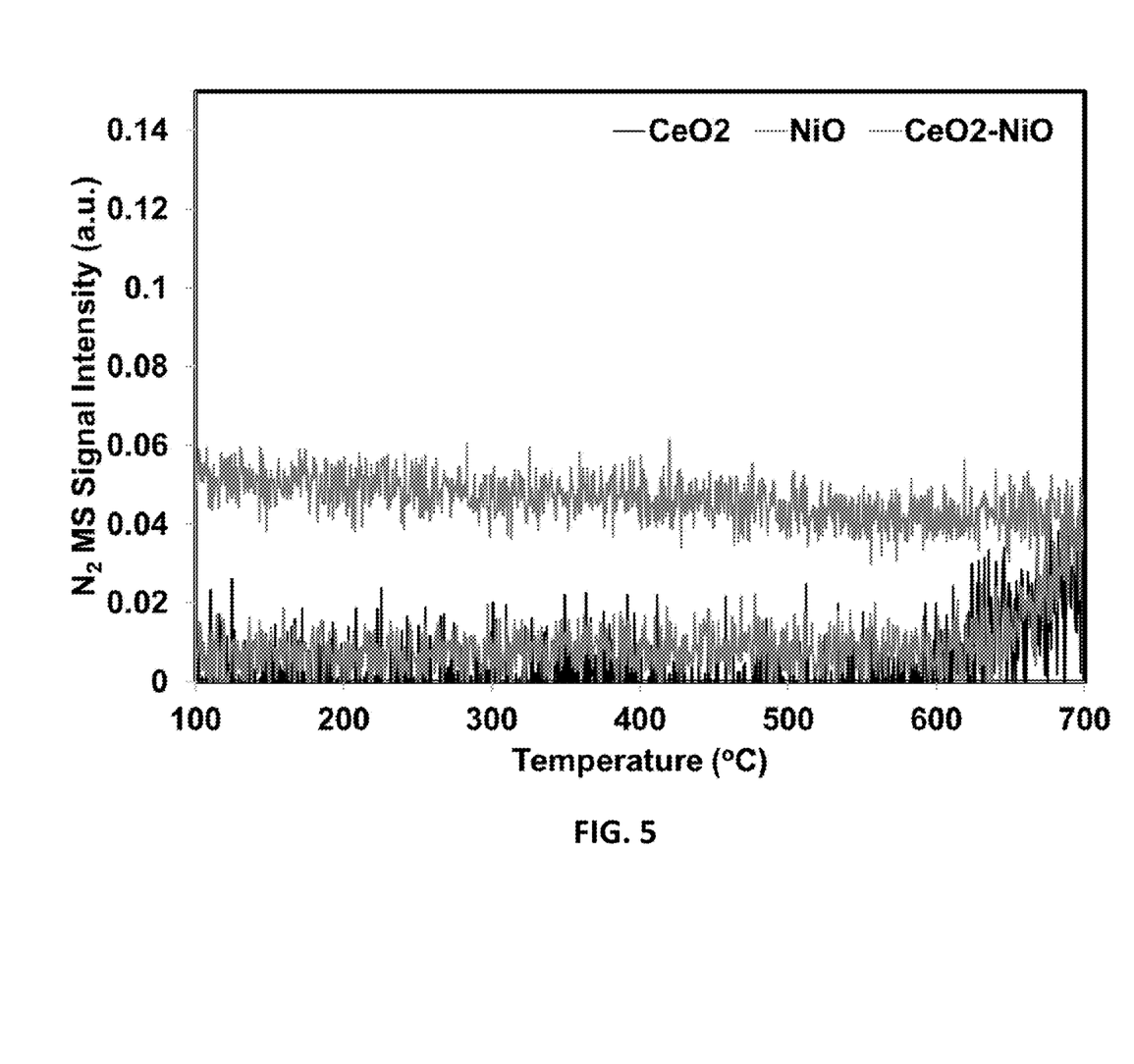
FIG. 5 provides the $N_2$ desorption profile over the $CeO_2$, NiO, and $CeO_2$—NiO catalysts from about 100° C. to about 700° C.
Figure 6:
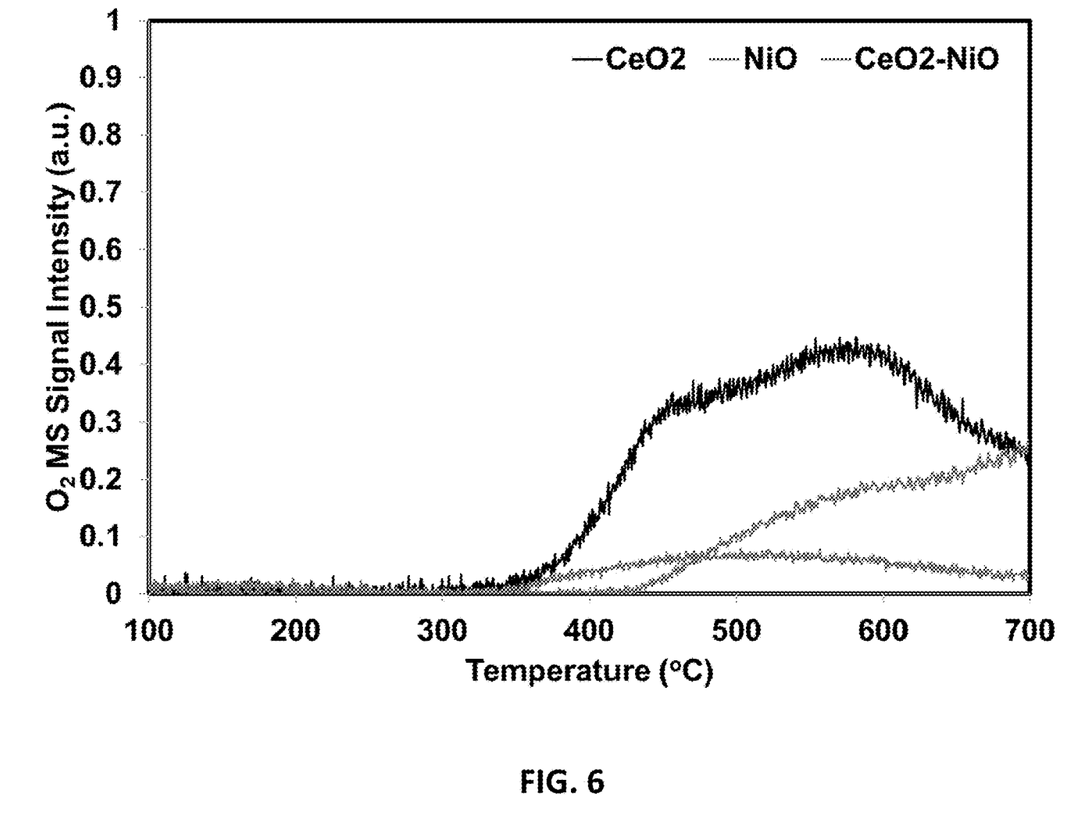
FIG. 6 provides the $O_2$ desorption profile over the $CeO_2$, NiO, and $CeO_2$—NiO catalysts from about 100° C. to about 700° C.
Figure 7:
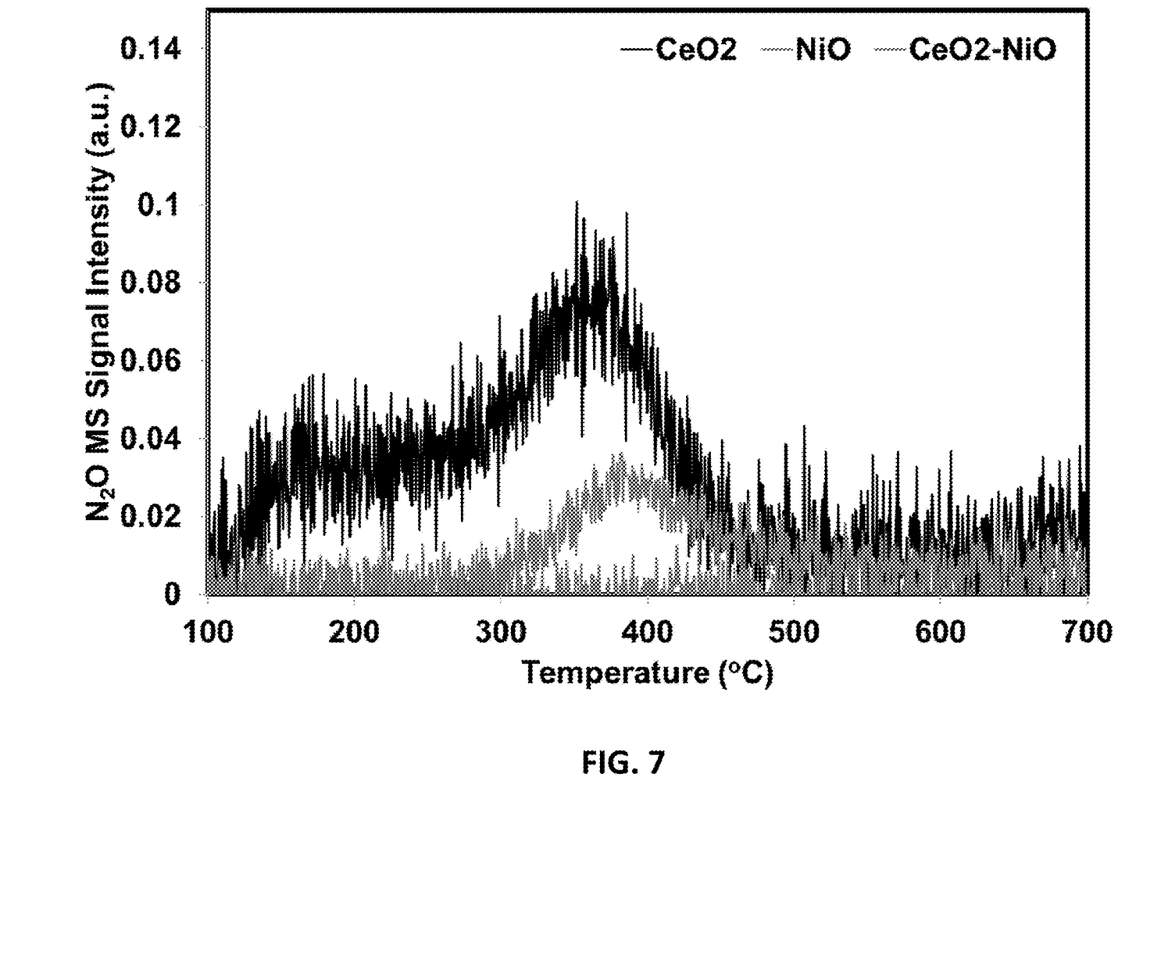
FIG. 7 provides the $N_2O$ desorption profile over the $CeO_2$, NiO, and $CeO_2$—NiO catalysts from about 100° C. to about 700° C.
Figure 8:
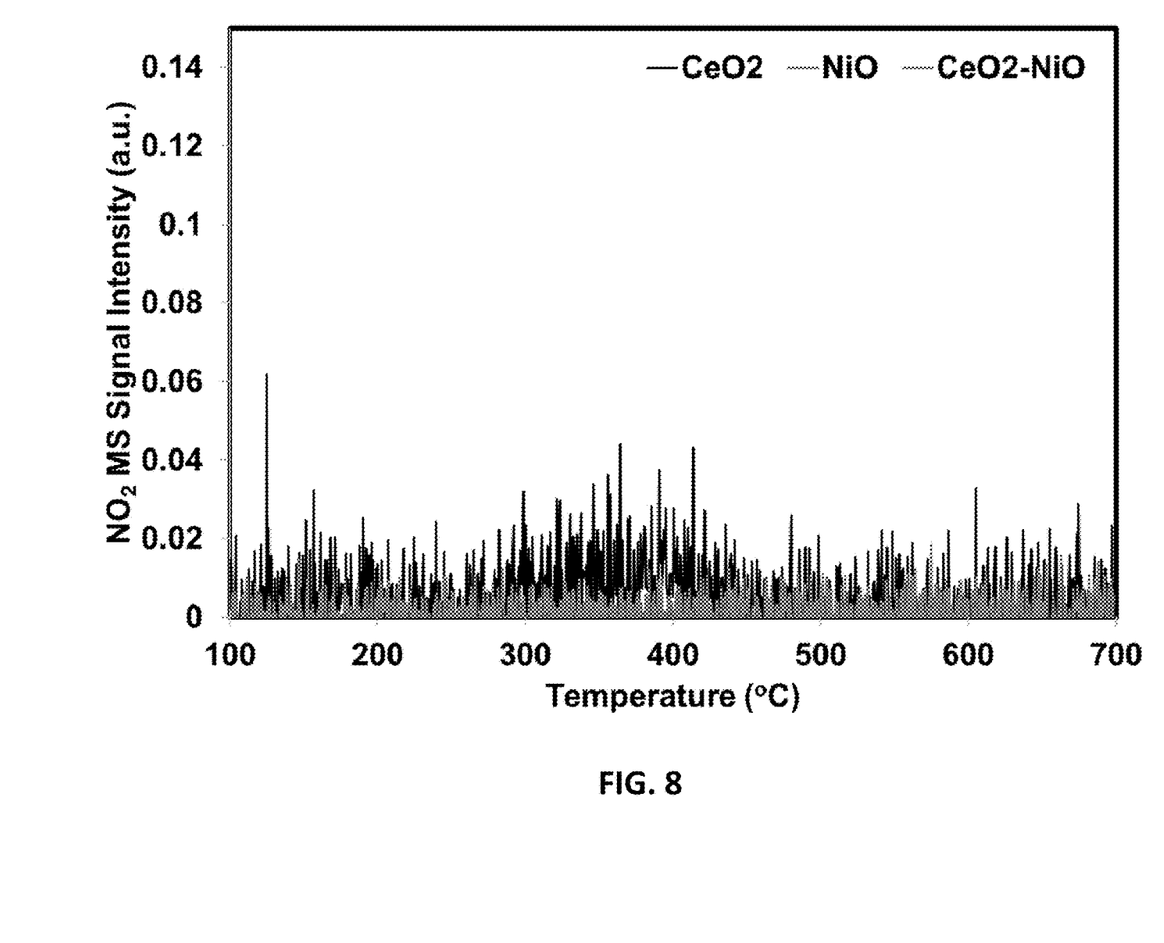
FIG. 8 provides the $NO_2$ desorption profile over the $CeO_2$, NiO, and $CeO_2$—NiO catalysts from about 100° C. to about 700° C.

The NOx desorption properties of the $CeO_2$, NiO, and $CeO_2$—NiO catalysts can be studied using the NO temperature programmed desorption (NO-TPD) method. In a typical NO-TPD experiment, first one will adsorb the NOx at 100° C., and then ramp the temperature from about 100° C. to 700° C. in an inert gas to desorb the products. The desorbed products can be measured using a mass spectrometer. During the desorption, NO decomposes and desorbs as the main products of $N_2$ and $O_2$, and/or the side products of $N_2O$ and $NO_2$. The $N_2$, $O_2$, $N_2O$, and $NO_2$ desorption temperature profiles over the $CeO_2$, NiO, and $CeO_2$—NiO catalysts are presented in FIGS. 5-8. As shown in FIG. 5, neither $CeO_2$ nor NiO release product $N_2$ until after a temperature of about 600° C. On the other hand, the $CeO_2$—NiO mixed oxide releases $N_2$ beginning at a temperature as low as about 100° C., and continuing throughout the entire temperature range. The product $O_2$ release is observed at a temperature of from about 350° C. and above for $CeO_2$ and $CeO_2$—NiO catalysts, and at a temperature of from about 450° C. and above for NiO, as shown in FIG. 6. These measurements show that only $CeO_2$—NiO can release both $N_2$ and $O_2$ at a temperature of from about 350° C., indicating its capability to perform stable direct NOx decomposition activity. As shown in the FIG. 7, $CeO_2$ releases $N_2O$ in the temperature range of from about 100° C. to about 400° C. $N_2O$ formation occurs due to the partial reduction of NO. On the other hand, no significant $N_2O$ release is observed for the $CeO_2$—NiO or NiO catalysts. As shown in FIG. 8, there is no $NO_2$ formation observed over any of the catalysts.

In summary, NOx adsorption and desorption property measurements show that, as compared to the $CeO_2$ and NiO, $CeO_2$—NiO adsorbs more total NOx as chelating nitrato intermediates and is able release nitrogen at a temperature of from about 100° C. and oxygen from 350° C. On the other hand, NOx chemically reacts with the $CeO_2$ during the adsorption, and makes structural changes to the $CeO_2$ surface. Even though NiO forms nitrite intermediates during the NO adsorption, it releases $N_2$ only at higher reaction temperatures and is active for direct NOx decomposition only at higher reaction temperatures.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst system for the direct decomposition removal of NOx from an exhaust gas stream provided at a temperature of from about 400° C. to about 650° C., the catalyst system comprising:
    a mixed oxide composition including cerium oxide and nickel oxide ($CeO_2$—NiO) represented as $Ce_{0.5}Ni_{0.5}O_2$,
    wherein the catalyst system is configured to catalyze a decomposition of the NOx to generate $N_2$ without the presence of a reductant.

2. The catalyst system according to claim 1, wherein the catalyst system comprises a cubic structure, with nickel incorporated in a cubic lattice of cerium.

3. The catalyst system according to claim 1, configured to provide an NOx selectivity to $N_2$ greater than about 95%.

4. A catalytic converter for the direct decomposition removal of NOx from an exhaust gas stream flowing at a temperature of from about 400° C. to about 650° C., the catalytic converter comprising:
    an inlet configured to receive the exhaust gas stream into an enclosure;
    an outlet configured to allow the exhaust gas stream to exit the enclosure; and
    a catalyst system contained inside the enclosure, the catalyst system comprising a mixed oxide composition including cerium oxide and nickel oxide ($CeO_2$—NiO) represented as $Ce_{0.5}Ni_{0.5}O_2$, configured to catalyze a decomposition of the NOx to generate $N_2$ without the presence of a reductant.

5. The catalytic converter according to claim 4, wherein the catalyst system comprises a cubic structure, with nickel incorporated in a cubic lattice of cerium.

6. The catalytic converter according to claim 4, configured to flow the exhaust gas stream through the catalyst system at a temperature at or greater than about 400° C. and obtaining an NOx selectivity to $N_2$ greater than about 95%.

7. A method for direct decomposition removal of NOx from an exhaust gas stream, the method comprising:
    flowing the exhaust gas stream through a catalyst system and exposing the exhaust gas stream to catalyst system comprising a mixed oxide composition including cerium oxide and nickel oxide ($CeO_2$—NiO) represented as $Ce_{0.5}Ni_{0.5}O_2$; and
    catalyzing a decomposition of the NOx to generate $N_2$ without the presence of a reductant.

8. The method according to claim 7, further comprising forming the catalyst system using co-precipitation techniques.

9. The method according to claim 8, wherein the catalyst system is formed having a cubic structure, with nickel incorporated in a cubic lattice of cerium.

10. The method according to claim 7, comprising flowing the exhaust gas stream through the catalyst system at a temperature of from about 400° C. to about 650° C., and obtaining an NOx selectivity to $N_2$ greater than about 95%.

11. A catalyst system for the direct decomposition removal of NOx, the catalyst comprising:
    a mixed oxide composition including cerium oxide and nickel oxide ($CeO_2$—NiO) represented as $Ce_{0.5}Ni_{0.5}O_2$,
    wherein the catalyst system is configured to catalyze a decomposition of the NOx to generate $N_2$ without the presence of a reductant.

* * * * *

UNITED STATES PATENT AND TRADEMARK OFFICE
CERTIFICATE OF CORRECTION

PATENT NO. : 10,071,367 B1  
APPLICATION NO. : 15/605178  
DATED : September 11, 2018  
INVENTOR(S) : Krishna Gunugunuri et al.

It is certified that error appears in the above-identified patent and that said Letters Patent is hereby corrected as shown below:

On the Title Page

Item (54) and in the Specification, Column 1, Lines 1-2, Title: "CEO$_2$-NIO MIXED OXIDE CATALYSTS FOR DIRECT NOX DECOMPOSITION" with -- CeO$_2$-NiO MIXED OXIDE CATALYSTS FOR DIRECT NOX DECOMPOSITION --

In the Specification

Column 4, Line 66: replace "2θ" with -- 2 Θ --  
Column 7, Line 3: replace "2θ" with -- 2 Θ --  
Column 7, Line 7: replace "2θ" with -- 2 Θ --

Signed and Sealed this  
Eleventh Day of December, 2018

Andrei Iancu  
*Director of the United States Patent and Trademark Office*